(No Model.) 4 Sheets—Sheet 1.
P. R. GOTTSTEIN.
PORTABLE SAWING MACHINE.
No. 365,917. Patented July 5, 1887.
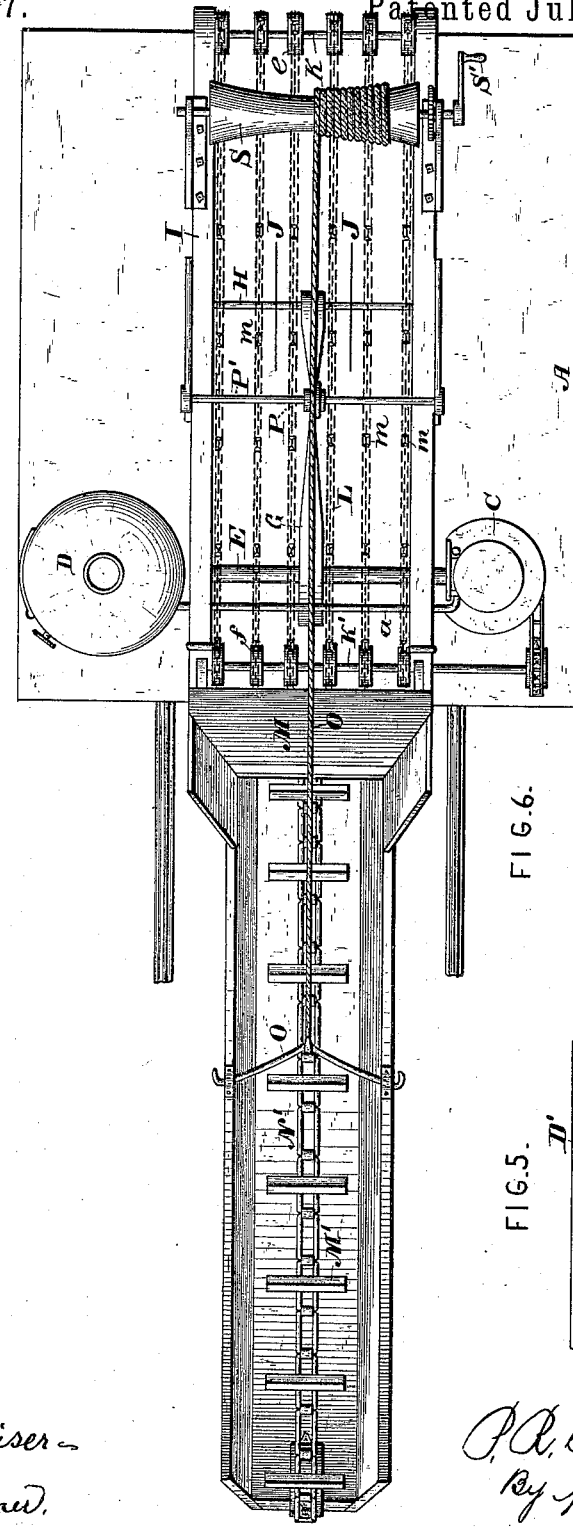
FIG. 1
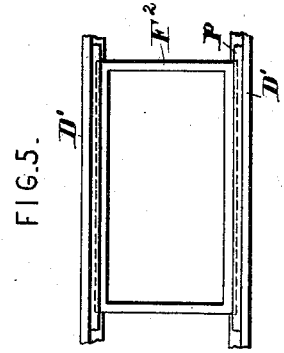
FIG. 6.
FIG. 5.
ATTEST-
J. Henry Kaiser
Harry L. Ames.
INVENTOR-
P. R. Gottstein,
By W. A. Redmond,
Atty.

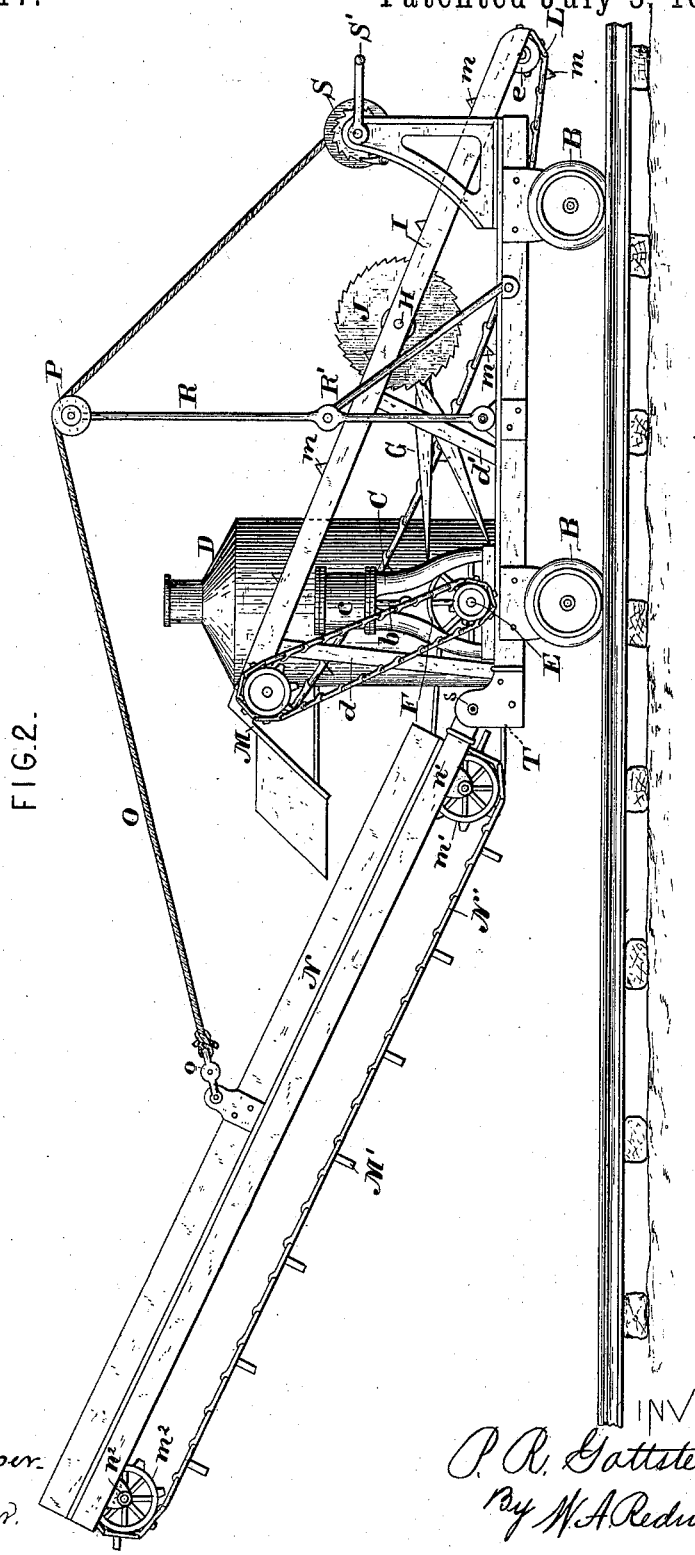

(No Model.)  4 Sheets—Sheet 3.
P. R. GOTTSTEIN.
PORTABLE SAWING MACHINE.
No. 365,917.  Patented July 5, 1887.
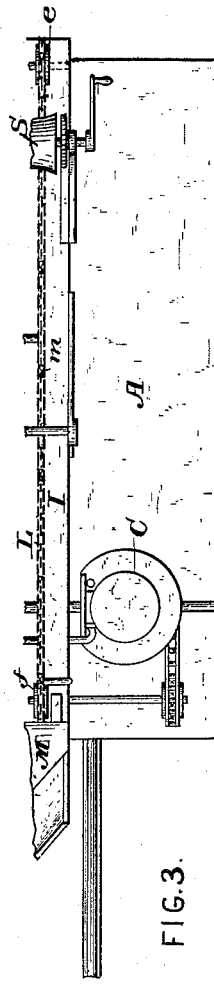
FIG. 3.
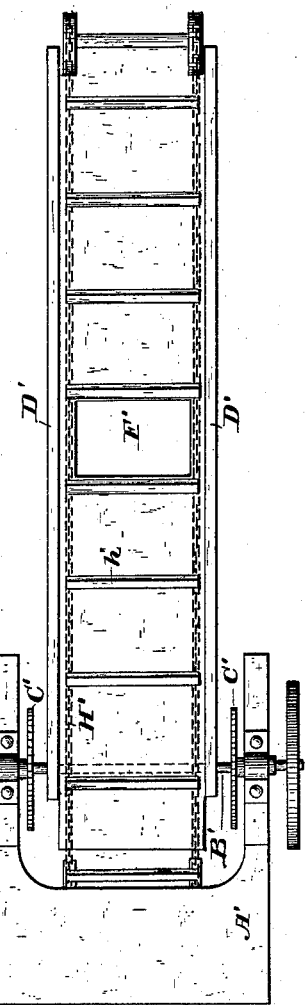
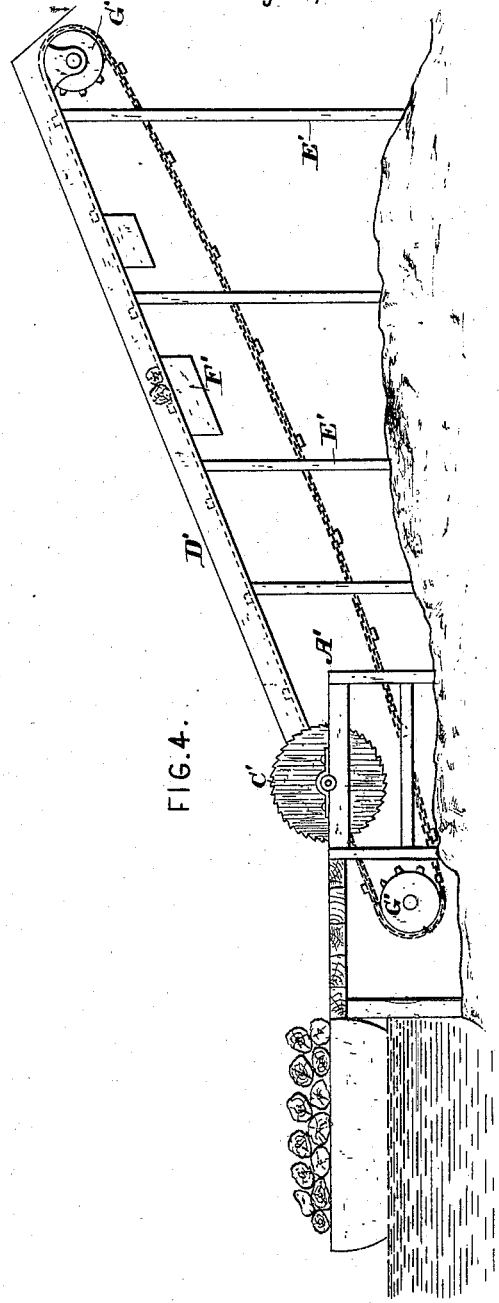
FIG. 4.
ATTEST—
J. Henry Kaiser
Harry L. Ames
INVENTOR.
P. R. Gottstein
By W. A. Redmond
Atty.

(No Model.)  P. R. GOTTSTEIN.  4 Sheets—Sheet 4.
PORTABLE SAWING MACHINE.
No. 365,917.  Patented July 5, 1887.
FIG.7.
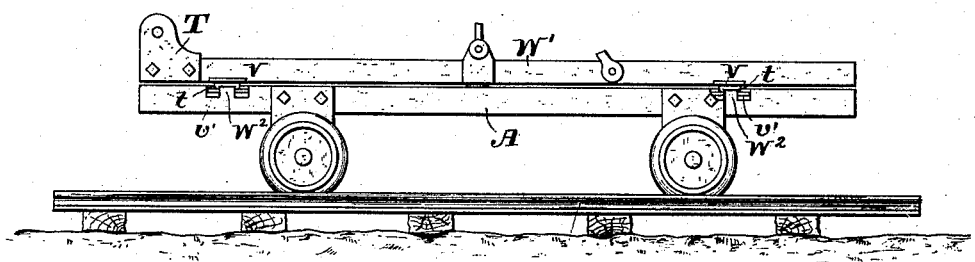
FIG.8.
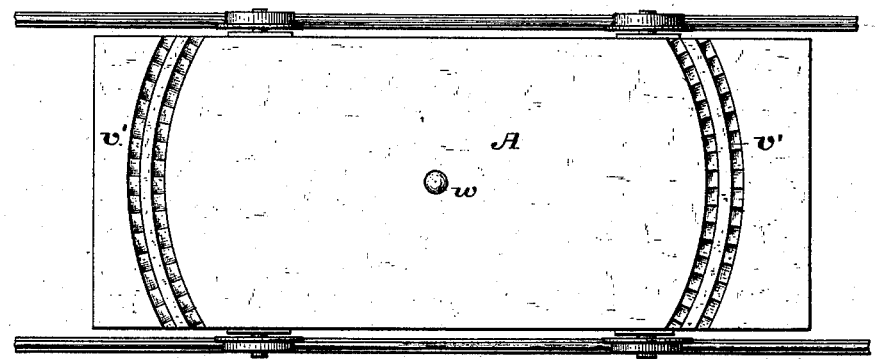
FIG.9.  FIG.10.
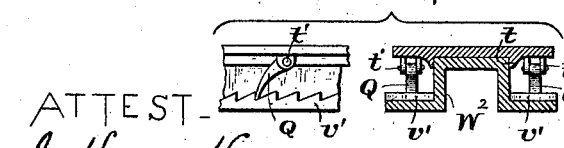
ATTEST:
J. Henry Kaiser
Harry L. Amer
INVENTOR:
P. R. Gottstein
By W. A. Redmond, Atty

UNITED STATES PATENT OFFICE.

PETER R. GOTTSTEIN, OF HOUGHTON, MICHIGAN.

PORTABLE SAWING-MACHINE.

SPECIFICATION forming part of Letters Patent No. 365,917, dated July 5, 1887.

Application filed January 11, 1886. Renewed March 16, 1887. Serial No. 231,184. (No model.)

*To all whom it may concern:*

Be it known that I, PETER R. GOTTSTEIN, a citizen of the United States, residing at Houghton, in the county of Houghton, State of Michigan, have invented certain new and useful Improvements in Portable Wood-Sawing Machines, of which the following is a specification, reference being had therein to the accompanying drawings.

My invention relates to portable wood-sawing machines, and has for its object to provide a simple, durable, and efficient machine which will convey the logs from a pile, or from cars or boats on which they may be loaded, to the saws, hold them against the same until sawed, and then carry the pieces forward to a delivery elevator or conveyer, which will convey them to any vehicle in waiting, or to a distance away from the machine. The machine is mounted on a turn-table, which may be mounted on a flat-boat or scow, or, as shown, on a suitable frame-work mounted on car or other wheels, so that it may be transported from place to place throughout the lumber-producing region at will; and it consists of the parts and combination of parts hereinafter described and claimed.

In the accompanying drawings, forming a part of this specification, Figure 1 is a plan view of my improved machine; Fig. 2, a side elevation of the same; Fig. 3, a plan view, partly broken away, showing an additional gang of saws, elevator, &c.; Fig. 4, a side elevation of the same; Figs. 5 and 6, detail views; Fig. 7, a side elevation of the turn-table and car; Fig. 8, a plan view of the flat car; and Fig. 9, detail views; Fig. 10, a detail view of a modification of the slide-iron.

A represents a low frame-work or flat car mounted on car-wheels B.

C is a steam-engine firmly secured to the platform of the car A on one side and connected by means of the steam-pipe $a$ to the boiler D on the opposite side of the car.

I have shown a vertical engine and boiler, which I prefer; but a horizontal boiler may be used, if desired.

A piston-rod, $b$, from the cylinder $c$ operates a crank on the main shaft E, which drives the machine. F is a pulley on the main shaft E, around which runs a belt, G. This belt is crossed and passes around a pulley on the saw-shaft H. The shaft H is journaled in the inclined frame I and carries the saws J. The inclined frame I is supported by the uprights $d\ d'$, the latter being secured to the platform of the car. In the lower end of the frame I is journaled a shaft, K, which carries a series of sprocket-wheels, $e$, a similar shaft, K', carrying sprocket-wheels $f$, being journaled in the upper end of said frame.

A series of endless chains, L, provided with saw-tooth shaped projections or lugs $m$, pass over the wheels $e\ f$. Upon the chains in front of the lugs $m$ the logs are laid, and thus carried up to and held against the saws until severed, when the pieces are carried up to and dropped over the chute M onto the delivery-elevator N, whence they are carried up and over the end into a conveyance in waiting, or dropped on the ground at some distance from the main body of the machine.

The delivery-elevator comprises the ordinary flaring frame used for this purpose and a single endless chain, N', provided with cross-slats or buckets M', the endless chain passing over sprocket-wheels $m'\ m^2$ on shafts $n'\ n^2$, journaled in hangers secured to the opposite ends of the elevator-frame and operated by a belt from the main shaft E. A guy-rope, O, is connected to a sling, $o$, by a hook or otherwise, and leads back over a grooved pulley, P, on a shaft, P', supported by the upright braces R and inclined braces R', and thence to the winch-barrel S. The winch is provided with a spring pawl and ratchet and a crank, S', whereby the elevator may be raised or lowered at will. The delivery-elevator is provided with short trunnions $s$, journaled in the knuckles or lugs T on the end of the platform of the car A. This construction does away with a great deal of labor in the handling of the logs, as the machine itself, after the logs have been placed upon the chains, saws the wood, loads it upon the conveyances in waiting according to length, or dumps it upon the ground without further handling.

In Figs. 3 and 4 I have shown an additional gang of saws attached to the machine and designed to be operated by and in connection therewith, especially on the banks of rivers, canals, &c. In these figures A' is the frame, in which is journaled the arbor B', which carries the saws C'. D' represents the elevator frame or boxing, supported by the uprights E' in an inclined position; F', the chutes in the bottom thereof; F², the doors or gates for the chutes, Figs. 5 and 6; G', the sprocket-wheels on a shaft suitably journaled in the frame of the elevators and the frame A'; and H', the endless chains, having cross slats $h'$ for conveying away the sawed wood. The doors or gates F² may be hinged to the bottom of the elevator D', as shown at $i$ in Fig. 6, or they may be sliding doors, as shown at $p$, Fig. 5. By means of these doors or gates and the chutes F' in the bottom of the elevator the sawed pieces may be dropped through onto cars, boats, &c., in waiting, so that two or more conveyances may be loaded at the same time. The chutes may be of different sizes, so that pieces of different lengths may be loaded onto different vehicles. The chains of the elevator extend downward beyond the saws and receive the wood as soon as sawed, carrying it away without any further handling on the part of the sawyer.

The arbor B' is connected directly with the main shaft of the engine, thus permitting the use of both gangs of saws at the same time with but little more help than would be required to operate one gang.

In Figs. 7, 8, 9, and 10 I have shown an arrangement whereby the main sawing-machine (shown in Figs. 1 and 2) may be turned around, so as to receive the wood from different directions without removing the machine from the flat car or the wheels of the latter from the rails.

A represents the frame-work of the flat car. From about the center of this frame-work a pivot, $w$, projects upwardly, forming an axis for the turn-table W', the latter being provided with an eye, into which the pivot $w$ fits, raising the table but slightly above the upper surface of the car-frame, so that it may turn readily without friction.

W² represents the iron ways on which the slide-irons V work. These ways and slide-irons are each cast in one piece in a segmental form, and are sunk in the turn-table and frame-work of the car, as clearly shown in Fig. 7. The iron ways W² are shaped like a bridge or U-rail, the lateral flanges $v$ of which are provided with ratchet-teeth $v'$ on their upper surfaces. The slide-irons V have on their under surfaces shoulders $t$, which fit snugly on each side of the ways W², so as to prevent any lateral movement of the turn-table, but yet permit of its free movement in a longitudinal direction. Pawls Q are hung between downwardly-extending lugs $t'$, (see left-hand view, Fig. 9,) which slip over and catch in the teeth of the ratchets.

The teeth of the ratchets face in opposite directions—that is, they oppose the pawls—so that if the turn-table be pushed from the left-hand side of Figs. 7 and 8 the pawls on that side will slip over the ratchets and away from the person, while the pawls on the right-hand side will slip over and toward the person; but any attempt to push it back from the right-hand side of said figures would be resisted unless the pawls are first raised.

Fig. 10 shows a slight modification of the slide-iron V, intended to reduce the friction between the parts and permit the table to be more readily turned. It consists in simply inserting in suitable recesses in the under surfaces of the slide-irons friction-rollers $k^2$.

Having thus described my invention, what I claim as new, and desire to secure by Letters Patent, is—

1. In a portable wood-sawing machine, the combination, with a flat car or other conveyance, an engine, and sawing mechanism thereon, and carrying-chains and a chute for carrying the sawed wood from the saws, of an adjustable delivery-elevator in position to receive the wood from the chute, supporting-uprights, and a guy-rope secured to such chute and connected to an operating-winch, as set forth.

2. A portable sawing-machine comprising the following elements: a flat car or frame-work, A, the engine and boiler supported thereon, the main shaft E, the inclined saw-arbor frame I, carrying the saws J and supports therefor, carrying-chains L, sprocket-wheels $e f$, and chutes M on the frame A, the adjustable delivery-elevator N, pivotally secured to one end of frame-work A, means for adjusting the same, and provided with suitable carrying-chains and sprocket-wheels, in combination with auxiliary saws C', carried by the main shaft E, and the elevator D', provided with the elevating-chain H', sprocket-wheels G', and chutes F', having adjustable doors, as set forth.

3. The combination, in a wood-sawing machine and with the platform thereof, of the turn-table W', located upon said platform and supporting the sawing-machine, the segmental slide-irons V, having the shoulders $t$, secured to the under side of said turn-table, and a suitable segmental way on said platform, substantially as and for the purpose described.

4. The combination, in a wood-sawing machine, of the platform A, turn-table W', pivotally secured to said platform and carrying the sawing-machine, the segmental slide-irons V, provided with shoulders $t$, and friction-rollers $k^2$, and suitable ways therefor secured to said platform, substantially as set forth.

5. The combination, in a wood-sawing machine, of the frame-work A, the segmental iron ways W² thereon, having lateral flanges $v$ and ratchet-teeth $v'$, and the sawing-machine-supporting turn-table W', pivoted to said frame-work and provided with segmental slide-irons V, carrying pawls Q, which engage said ratchet, substantially as set forth.

In testimony whereof I affix my signature in presence of two witnesses.

PETER R. GOTTSTEIN.

Witnesses:
ALLEN F. REES,
JAMES O'GRADY.